(12) United States Patent
Collins

(10) Patent No.: US 8,973,176 B1
(45) Date of Patent: Mar. 10, 2015

(54) CONTROL OF HEAT TRANSFER IN SPA OR POOL WATER FLOW SYSTEM

(75) Inventor: Jeffrey W. Collins, Valencia, CA (US)

(73) Assignee: Thornbury Investments, Inc., Valencia, CA (US)

( * ) Notice: Subject to any disclaimer, the term of this patent is extended or adjusted under 35 U.S.C. 154(b) by 1030 days.

(21) Appl. No.: 12/803,227

(22) Filed: Jun. 21, 2010

Related U.S. Application Data

(60) Provisional application No. 61/269,695, filed on Jun. 29, 2009.

(51) Int. Cl.
*E04H 4/00* (2006.01)

(52) U.S. Cl.
USPC .................................................. 4/493

(58) Field of Classification Search
CPC ........................................................ E04H 4/129
USPC ....................................... 4/488–513, 545, 538
See application file for complete search history.

(56) References Cited

U.S. PATENT DOCUMENTS

| | | | | |
|---|---|---|---|---|
| 4,763,365 A * | 8/1988 | Gerondale et al. | ................ | 4/493 |
| 4,843,659 A * | 7/1989 | Popovich et al. | .............. | 4/541.3 |
| 5,526,538 A * | 6/1996 | Rainwater | ....................... | 4/541.1 |
| 5,829,069 A * | 11/1998 | Morgan et al. | .................... | 4/493 |
| 6,590,188 B2 * | 7/2003 | Cline et al. | ..................... | 219/497 |
| 6,965,815 B1 * | 11/2005 | Tompkins et al. | ............ | 700/300 |
| 6,976,052 B2 * | 12/2005 | Tompkins et al. | ............ | 709/201 |
| 8,014,902 B2 * | 9/2011 | Kates | ............................. | 700/275 |
| 8,572,769 B2 * | 11/2013 | Gamracy et al. | .................. | 4/545 |
| 2002/0050490 A1* | 5/2002 | Pittman et al. | ................ | 219/481 |

\* cited by examiner

*Primary Examiner* — Lori Baker
(74) *Attorney, Agent, or Firm* — William W. Haefliger

(57) ABSTRACT

In a spa or pool water temperature control system, the combination comprising, a water flow pump, having a motor, the pump operating to transfer heat generated by the pump motor to the water flowing through the pump, and to the spa or pool, a hi-limit temperature sensor located to detect the temperature of the pumped water, a temperature sensor operatively connected in controlling relation with the pump, in close proximity to the aforementioned hi-limit sensor to effect accurate sensing of the pumped water temperature, a control system that monitors said sensors and provides for manual pump activation as well as thermostatic control of the water temperature.

10 Claims, 1 Drawing Sheet

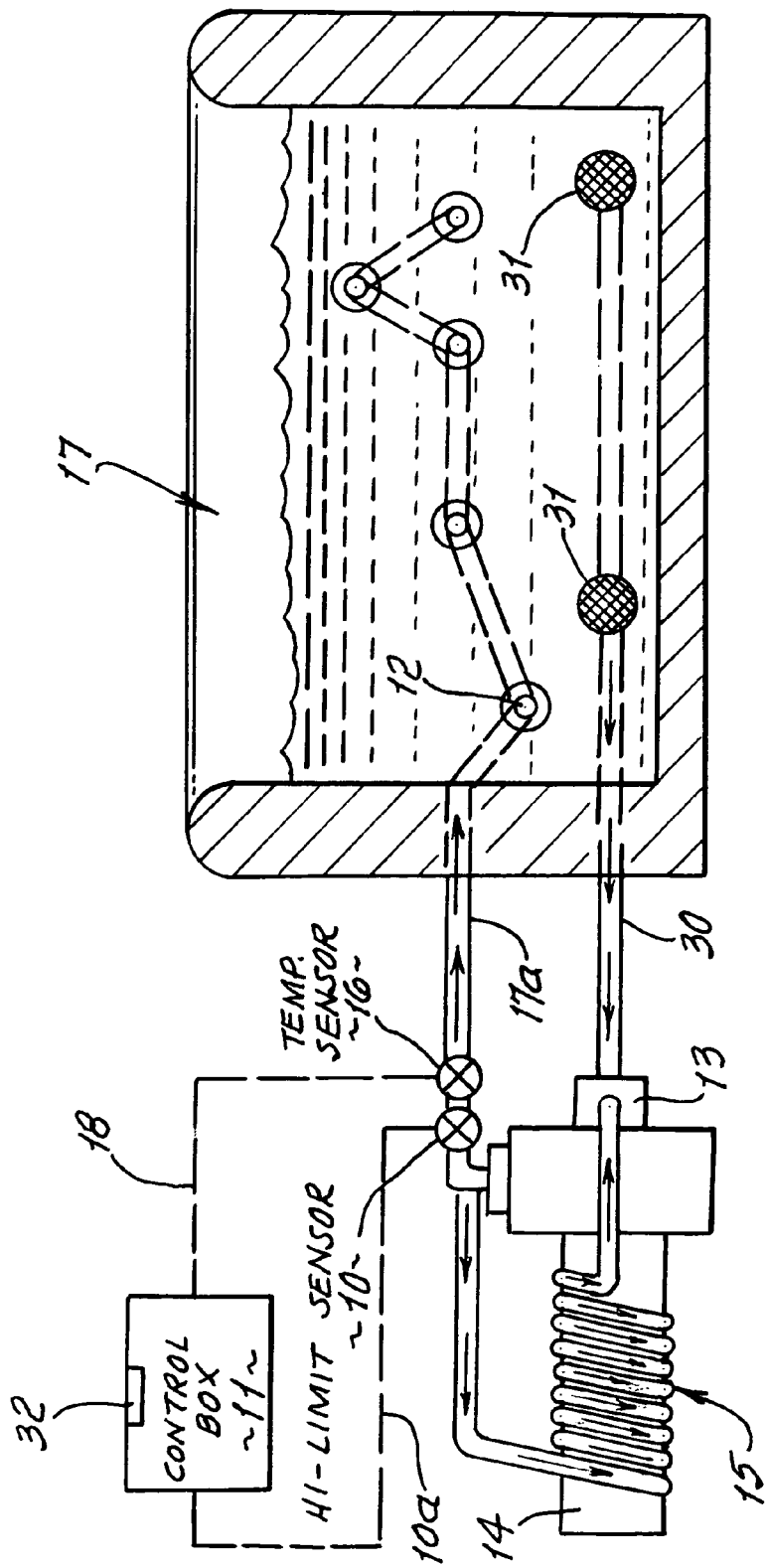

CONTROL OF HEAT TRANSFER IN SPA OR POOL WATER FLOW SYSTEM

This application claims priority from provisional application Ser. No. 61/269,695 filed Jun. 29, 2009.

BACKGROUND OF THE INVENTION

Apparatus for controlling the operation of a heat transfer pump or thermal heat transfer device, provided to both pump and/or move water from one point to another with a means for removing heat from the motor or pump assembly and, thereby, adding such heat to the water being moved, as well as employing a control system to turn the flow of water on and off, and operating to control the function of the motor in response to a need to add heat to the water to a desired level as well as additionally controlling possible overheat situations and the prevention of false overheat, reporting through an independent circuit that is included but exclusive of the main control. Additional controlling of the motor provided to turn on and off to alleviate any undesired false readings of installed temperature sensing equipment, to control said pump thermostatically as well as for controlling potential secondary or ancillary devices that operate to facilitate the movement of the water through the pump without powering the pump itself or means of ancillary cooling of the heat pump or thermal transfer heating system.

Many benefits of hot water therapy have been established to alleviate or sooth not only aches and pains, but also the mind. Soaking in heated water is now a commonly prescribed action for many physical ailments. As modern medicine continues to correct and curtail various physical and medical challenges, additional positive attributes of heat, increased buoyancy and non-impact therapy are constantly being discovered. Simply put: as the average lifespan increases and people live longer, the benefits of using heated water to soothe aches and pains is being utilized by more people that ever before. In addition to more people living longer, people must learn to conserve and utilize resources to the highest efficiency possible. Gone are the days of wasting energy because it is cheap and replaceable: it must be conserved and used wisely.

A hot tub or spa has become a desired feature for use in today's life. In the past three decades, owning a hot tub or spa has gone from a luxury only available to the affluent to becoming an almost standard household appliance in many communities. In so much as this is beneficial to the home owner, possessing a vessel that constantly houses a large supply of water that is kept at an elevated temperature can prove to be expensive. Not only is it costly on a monetary scale to pay to keep such an appliance running, it is also taxing to the overall energy supply. Hot tubs and spas have evolved and are currently manufactured with careful consideration paid to the retention of heat energy. Units are constructed with structures, plumbing assemblies and cabinets that work in concert to contain the heat of the water, with covers for the vessels being designed to be just as robust and efficient.

SUMMARY OF THE INVENTION

This invention relates generally to the application of heat transfer pump or heat transfer technology specifically in the hot tub or whirlpool industry. It is common to utilize a heat pump or pump and thermal transfer system in a hot tub or whirlpool application. The basic controls for the system employ a sensor and control to turn the pump on and off, either at the discretion of the user, or to maintain a desired temperature level of the water in the tub. The sensor, ultimately, works to control the power to the pump, allowing the unit to be cycled on and off thermostatically, in order to maintain a preset or predetermined temperature level of the body of water, or as the movement of the water by the motor is desired. In standard applications, the temperature sensor is in contact with the main body of water in order to sense and maintain the desired temperature of the body of water.

Controls for running a hot tub or whirlpool typically include provisions for powering an independent heater, which provides heating for the water through a means separate from the pump itself. Said heater normally requires a pump to move the water through the heater, allowing the heat to be added to the water while removing heat, or cooling the heater, itself. The heater is powered independently and separately from the pump that moves the water through the heater. Specific controls as well as safety systems are employed in order to insure that the heater does not either overheat the water or overheat the heating unit itself.

In order to ensure safety, there are several measures employed in order to prevent a malfunction situation wherein continual heating may cause damage to the heater, the tub itself or to prevent an overheat condition of the water that could cause an unsafe environment for the user. Such systems and components are designed to sense the flow of the water, sense pressure in the system, monitor the temperature differential between the incoming water versus the outgoing water and/or other means as provided to ensure that the water is, indeed, flowing through the heater, heating the water and cooling the heater itself. In a situation wherein preset operational constraints are met or exceeded, the control system will shut down or turn off power to the heater. A standard procedure often utilized is a continued running of the pump that moves the water through the heater, in an effort to cool down the heater itself once the power to it has been shut down.

An additional safety feature that is mandated by several national safety standard is the inclusion of a separate and independent temperature regulating circuit. This circuit is designed to be used in conjunction with the heater component, and will deactivate the control system and/or power supply to the heater in the event that such a circuit and its sensor detects a condition where the water or the heater itself or a component of the heater reaches a temperature above a preset level or threshold. In such situations, the power to the heater itself is shut off, while power to the pump will continue to be applied, continuing to flow water through the heater in an effort to cool the heater that is too hot.

One of the operational constraints of utilizing a heat transfer pump or thermal heat transfer pump is the fact that the pump itself runs at an elevated temperature, by design, in order to facilitate the heating of the water. In order to effectively transfer heat, a part of the embodiment of the heat pump or thermal heat transfer pump reaches said elevated temperature that is above the temperature of the water or medium flowing through it. It is this temperature differential that affords the ability to raise the temperature in the water or medium which, in turn, cools the heat pump or heat transfer pump. Absent water or media flowing through the pump, or a reduction of flow of water or media, said pump will begin to operate at a higher heat level, with potential damage to the pump or plumbing or a hazardous condition affording an elevated temperature of the water or medium flowing through the heat pump being created.

In an application where the amount of heat being added is not of consequence or where the water or media being utilized is not being precisely controlled as is done in a spa or hot tub application, the operational constraints of the additional heat described herein are not of consequence. However, in an application where the precise control of the water temperature is desired in order to prevent potential injury to users or occupants, the control of the temperature of the heat pump or thermal transfer pump itself proves critical.

In the industry, there are examples of hot tubs or whirlpools that employ control systems, pumps and separate heaters that work in concert. There are also examples of control systems and heat pumps or pumps with heat transfer characteristics wherein the heat pump is used as an ancillary additional heating system to aid the primary heating system or situations where the control utilizes only one sensor to monitor the temperature. There are currently no designs where a heat pump or pump with heat transfer characteristics utilizes both a temperature sensor or temperature sensor circuit that controls the temperature of the body of water and a hi-limit circuit to prevent an over heat or over temperature situation utilized for the heat pump or thermal heat transfer pump itself. Additionally, there are no existing provisions for controlling or handling a situation wherein such hi-limit or temperature sensing provisions afford the ability to actively reduce any elevated temperature sensed on the pump itself or within the water or media controlled by said pump.

The present invention involves utilizing the aforementioned spa control system and a heat pump, with operational parameters of the control system working in concert with the pump. Existing control systems and heat pumps can not work together if the heat transfer pump is being used to provide movement of the water, as well as being the only means or method of heating the water being employed.

Due to the design constraints and operational protocols mentioned with regard to heat pumps, when the pump is operating properly, the unit itself needs to attain temperatures higher than allowed by the existing National Safety Standards and outside the recognized safe bathing temperatures for users of a hot tub. Conventional heating methods utilize a heat source such that, when water is passed by it, the heating element is cooled, thus heating the water. The high limit temperature limiting device is installed in direct contact with the heater itself. In an instance wherein the heater is out of control, or the pump refrains from moving enough water through the heater to cool the heater sufficiently, the power to the heater is eliminated and the pump continues to run to cool the heater and heating element.

In a heat pump embodiment, the temperature is purposely elevated, and in the event of an overheat situation, conventional reasoning and control designs do not work, since the heater itself can not be turned off independent of the pump, and continuing to run the pump will not cool the heater, but rather will continue to elevate the temperature of the water.

The present invention monitors the temperature of the water or medium entering or exiting the heat pump in an effort to maintain the desired temperature of the water or medium. The temperature sensor associated with the spa or pool body of water controls the operation of the pump for both desired water movement and therapy as well as to maintain the desired water temperature. The hi-limit sensor monitors the temperature of the water in order to prevent an over-temperature situation in the event of a failure of the primary temperature sensing device.

When the pump either shuts off after reaching the desired temperature or the pump timing cycle for hydro-therapy or desired movement of the water, the pump will be shut off. In such an action, due to the design constraints of the heat pump, the temperature of the water contained within the heat pump system will elevate well above the desired temperature and/or the operational temperature of the water. This action, in turn, elevate the water beyond the desired and designed limits of the hi-limit sensor. Using current art or controls existing in the industry, the hi-limit sensor will shut down the system completely, or it will turn on the pump to cool the heater. In a heat pump application, this action will actually begin adding more heat to the water.

The use of a hi-limit sensor to monitor the water moving through the system on the output side of a heater or heat pump and not in direct contact with the heater itself as disclosed herein is a novel and unique way of operation, not being currently used in the industry. Additionally, the employment of a controlled shut-down cycling action to cool the heat pump without adding additional heat as disclosed herein is of considerable advantage.

These and other objects and advantages of the invention, as well as the details of an illustrative embodiment will be more fully understood from the following specification and drawings, in which:

DRAWING DESCRIPTION

FIG. 1 is a diagram showing apparatus embodying the invention.

DETAILED DESCRIPTION

Referring to FIG. 1, if hi-limit sensor 10 detects water temperature in excess of set-point, the sensor output at 10a operates the on/off control 11 (for motor 14) to shut pump 13 down. This means that all flow of water from the pump at 12 to the spa 17 via duct or path 17a is interrupted.

Temperature sensor 16 is in close proximity to the hi-limit sensor 10, with both positioned to sense any change in water temperature, but mainly temperatures exceeding the temperature set by control 11.

If the temperature sensed by temperature sensor 16 is higher than the set temperature in controller 11, the control 11 connected at 18 to 16 will turn off power to the motor 14, thus shutting down pump 13. If the temperature sensor 16 detects a rise in temperature at sensor 16 after the motor and pump have been shut down, the control 11 will turn on the pump for T1, thus affording a replacement of water in the heat pump (a combination of motor 14, pump 13 and water heating system 15 shown as water coils about the motor). At the end of a time interval T1, the motor 14 will be shut down and an active monitoring by the temperature sensor 16 will begin again.

Hi-limit sensor 10 only operates to communicate with control 11 to shut down the motor 14, thus deactivating the pump 13 and heat exchanger/heat pump 15.

Accordingly, dual sensors of water temperatures are provided and operated as described.

Water flows to the pump intake via coils 15, and also via a path 30 connected to intake 31 in the spa water near the bottom of the spa. A manual control 32 at 11 allows manual control of pump operation.

I claim:

1. In a spa or pool water temperature control system, the combination comprising,
   a) a water flow pump, having a motor,
   b) the pump operating to transfer heat generated by the pump motor to the water flowing through the pump, and to the spa or pool,
   c) a hi-limit temperature sensor located to detect the temperature of the pumped water,
   d) a temperature sensor operatively connected in controlling relation with the pump, in close proximity to the aforementioned hi-limit sensor to effect accurate sensing of the pumped water temperature, e) a control system that monitors said sensors and provides for manual pump activation as well as thermostatic control of the water temperature, power to the pump motor being turned off if the temperature of the pumped water exceeds a hi-limit detected by the hi-limit sensor, f) there being water flow coils proximate said motor, said coils receiving a first portion of water flow from the pump output, and delivering heated water to the pump, the pump also connected to receive water delivery from the spa, or pool, at least one of said coils being directly wrapped around the pump motor to receive heat therefrom, in endwise spaced relation from the pump, g) both the hi-limit temperature sensor c) and the temperature sensor d) being located in series in the path of a second portion of the flow from the pump and return to the pool or spa, and at the output side of the pump, both of said sensors being spaced from the pump to be out of direct contact therewith, both sensors being in heat transfer contact with one portion of the flow from the pump, and the coils being in heat transfer contact with another and separate portion of the flow from the pump.

2. The combination of claim 1 wherein the control system is programmed and includes means for cycling the pump after the pump has shut down after running thermostatically, and the temperature being read has elevated on its own absent the continued running or activation of the heat pump after a manual activation.

3. The combination of claim 2, wherein the control system is programmed and includes means for cycling the pump after the pump has shut down after running, in response to a manual activation.

4. The combination of claim 2, wherein the control system is programmed and includes means for cycling the pump after the pump has shut down after running thermostatically.

5. The combination of claim 2, wherein the control system is programmed and includes means for responding to a sensed change in temperature condition as sensed by the temperature sensor after the pump has shut down after running, in response to a manual activation.

6. The combination of claim 2, wherein the control system is programmed and includes means for responding to a sensed change in temperature condition as sensed by the temperature sensor after the pump has shut down after running thermostatically.

7. The method of operating the system of claim 1 that includes:

h) systematically cycling the pump after running thermostatically, and the temperature being read has elevated on its own absent the continued running or activation of the heat pump after a manual activation.

8. The method of operating the system of claim 1 that includes:

h) systematically cycling the pump after the pump has shut down after running, and in response to manual activation.

9. The combination of claim 1 wherein said pump motor is the only source of heat for heating water delivered to the spa.

10. The combination of claim 1 wherein said first and second portions of the flow are separate and emanate from one flow stream discharging from the pump.

* * * * *